June 22, 1948.　　　　　G. W. LANG　　　　　2,443,683
TILE MAKING MACHINE
Filed Jan. 29, 1947　　　　　　　　　　3 Sheets-Sheet 2
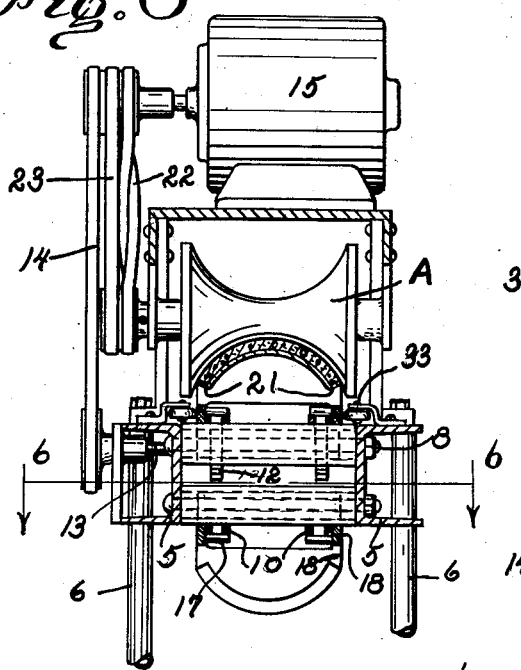
Fig. 3
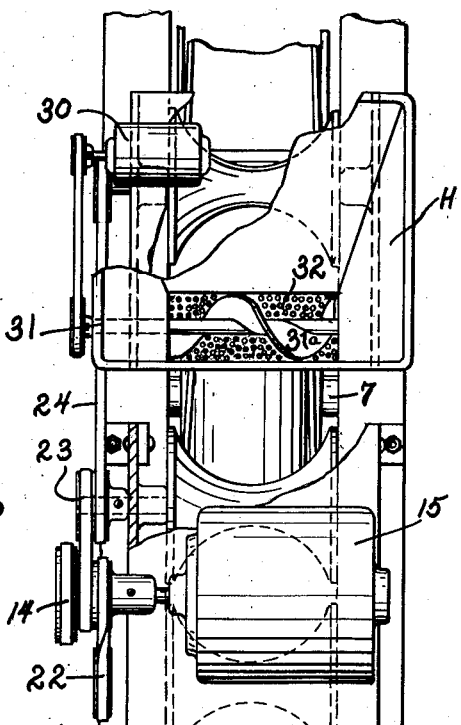
Fig. 4
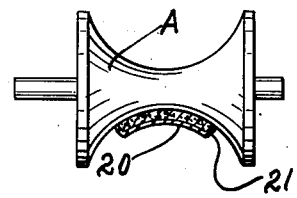
Fig. 5
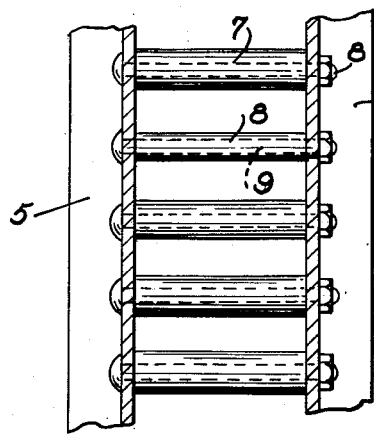
Fig. 6
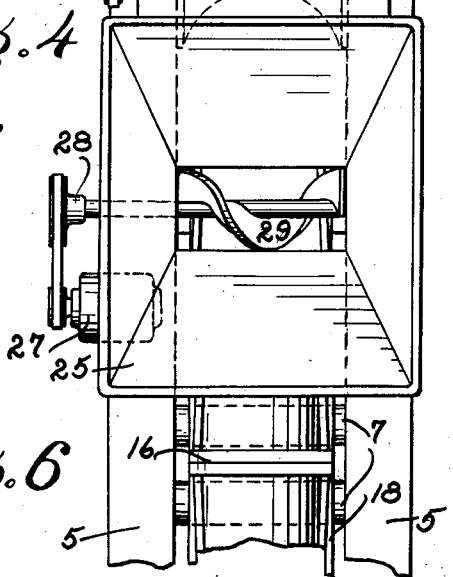
INVENTOR.
Gus W. Lang
BY
Shepherd & Campbell
Attorneys June 22, 1948.  G. W. LANG  2,443,683
TILE MAKING MACHINE
Filed Jan. 29, 1947  3 Sheets-Sheet 3
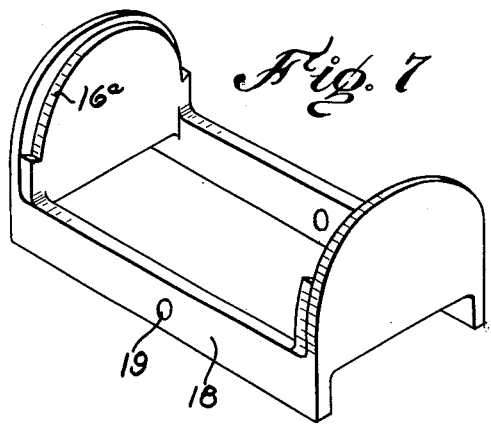
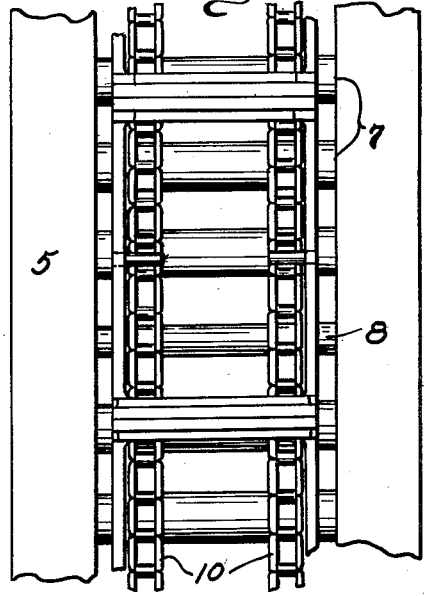
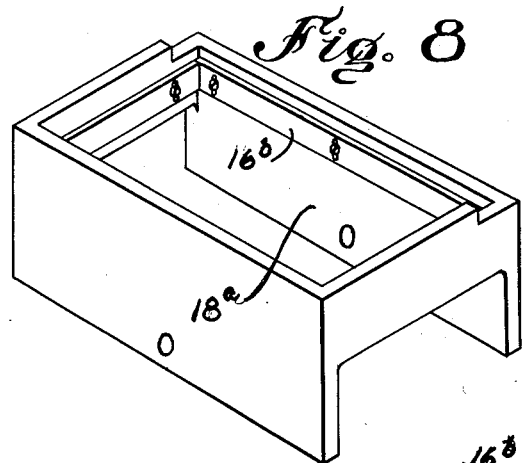
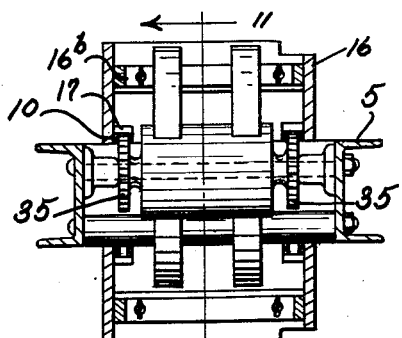
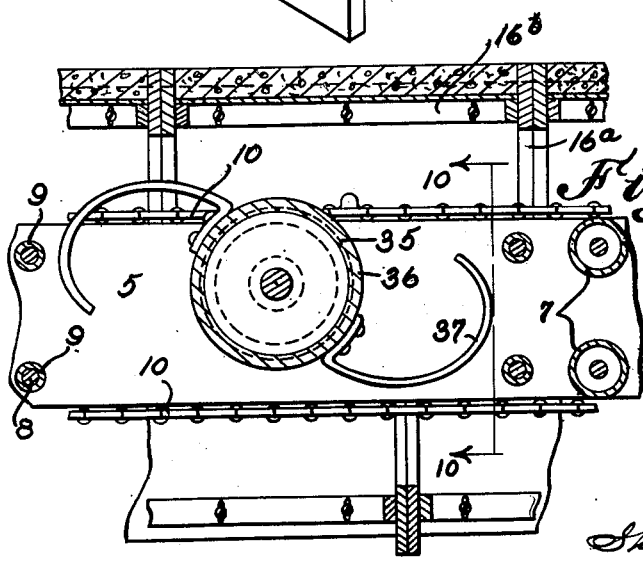
INVENTOR.
Gus W. Lang
BY
Shepherd & Campbell
attorneys Patented June 22, 1948

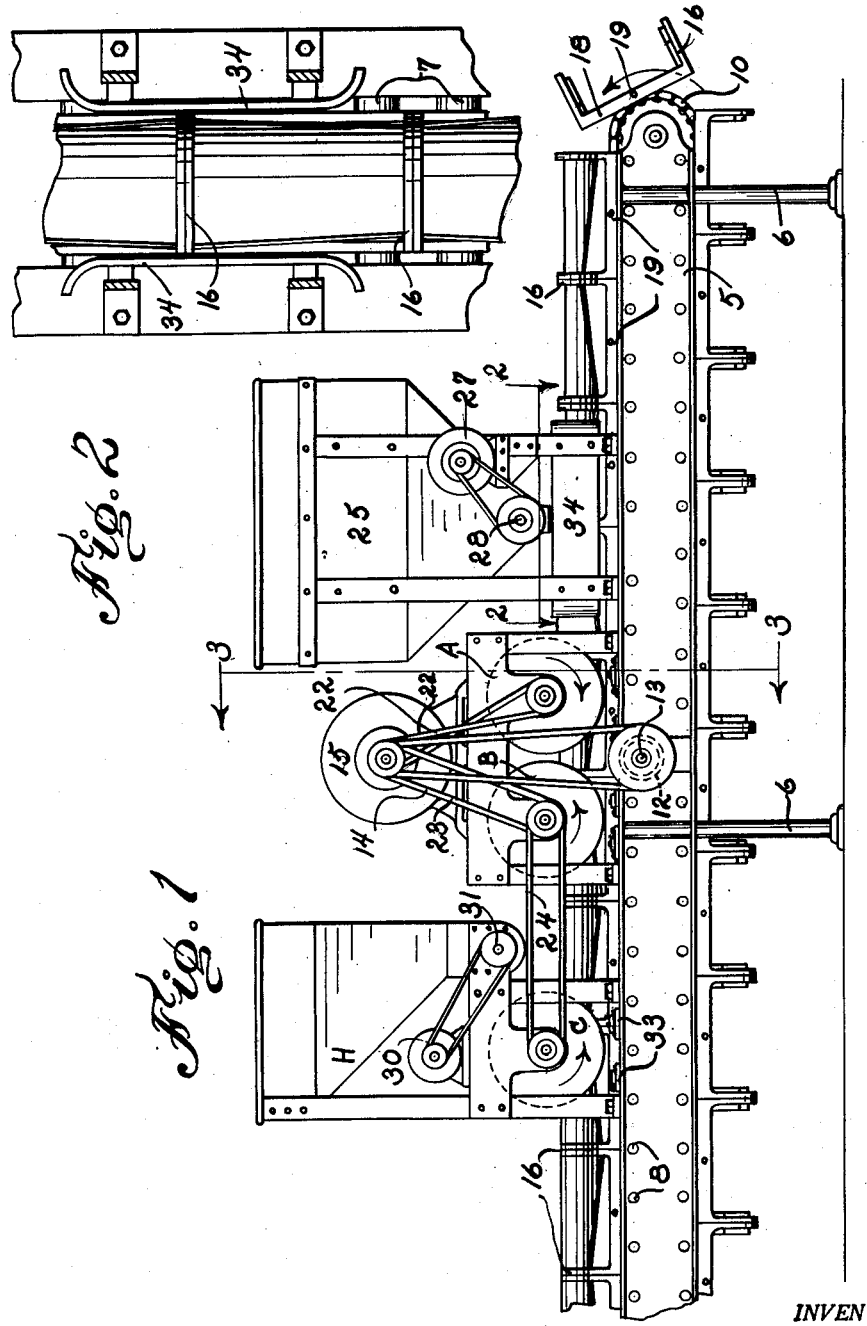

2,443,683

UNITED STATES PATENT OFFICE 2,443,683

TILE MAKING MACHINE

Gus W. Lang, Miami, Fla.

Application January 29, 1947, Serial No. 725,024

3 Claims. (Cl. 25—43)

1

The object of this invention is to provide a machine for rapidly and economically making cement roofing tile in an automatic and continuous operation. In the particular embodiment of the invention chosen for purposes of illustration, a traveling conveyor conducts a plurality of platens or pallets beneath a plurality of revolving rollers. Prior to the passage of a platen or pallet beneath the rollers a measured quantity of the cement mortar (known in the art as the "mud") is fed into and upon the platen or pallet. The mud consists of sand and hydraulic cement and just enough water to cause the particles to adhere. A mixture of this sort if placed in a pile will retain its pile shape and will harden in that shape if left to itself. The action of the several rollers upon the cement mix will be best understood by reference to the accompanying drawings wherein:

Fig. 1 is a side elevation of one form of machine embodying the principles of the invention.

Fig. 2 is a fragmentary plan view of the bed of the machine illustrating several of the platens or pallets in place.

Fig. 3 is a transverse sectional view upon line 3—3 of Fig. 1.

Fig. 4 is a plan view of the machine.

Fig. 5 is a detailed view of one of the concave rollers used in making concave and tapering tile.

Fig. 6 is a detailed view of part of the bed of the machine.

Fig. 7 is a perspective view of one of the platen or pallet carriers adapted to receive a concavo-convex platen or pallet.

Fig. 8 is a perspective view of a platen or pallet carrier adapted to receive a platen or pallet of the shape used in making flat tile.

Fig. 9 is a fragmentary plan view of a part of the bed of the machine illustrating the conveyor chains and some of the platen or pallet carriers, the chains and carriers together making up the traveling conveyor, hereinafter described.

Fig. 10 is a transverse sectional view upon line 10—10 of Fig. 11.

Fig. 11 is a transverse sectional view upon line 11—11 of Fig. 10 illustrating a platen or pallet lifter, hereinafter described.

Fig. 12 is a transverse sectional view illustrating the type of tile made when the carrier of Fig. 8 is used.

Fig. 13 is a detailed view illustrating the shape of platen or pallet employed when a concave tapering tile is to be made.

Like numerals designate corresponding parts in all of the figures of the drawings.

2

The machine shown for purposes of illustration, comprises a bed made up of the opposed channel irons 5, supported upon legs 6. Rollers 7 are free to rotate upon rods 8, said rods being carried by the channels 5. Tie rods and spacers 8 and 9, together with the roller 7 make up the bed of the machine over which endless conveyor chains 10 travel. Movement is imparted to these chains by sprockets 12 on shaft 13. This shaft is driven by a belt or other suitable driving connections 14 from a main drive motor 15.

In Fig. 1, I have illustrated platen or pallet carriers 16 as being connected to the chains to be carried along by the chains with their ends disposed in closely abutting relation. However, it will be clear that a platen or pallet carrier of the form illustrated in Fig. 8 could just as easily be secured to the chains. The form of tile made by the machine is determined by the shape of the platen or pallet and the shape of the forming rollers which co-act with the platens or pallets. By referring to Fig. 3, it will be seen that pins 17 carried by the chains engage sidewalls 18 of the platen or pallet carriers substantially at the central points indicated at 19 in Fig. 7. See also the righthand end of Fig. 1.

As the carriers ride around upon the top of the chain they are brought into end to end relation. An attendant places upon each carrier a platen or pallet like that illustrated in Fig. 13 with the concave surface of the platen or pallet resting upon the ledges 16a of the carrier. It will be observed that these platens or pallets 20 have on their outer edges outstanding flanges 21 and these flanges serve an important purpose in that they permit the rapid manufacture of the conventional concave and tapering Spanish tile in a continuous operation. By referring to Fig. 3 it will be seen that the rollers which co-act with the platens or pallets are concave and that their peripheries are concentric with the body portions of the platens or pallets, but lie in spaced relation to such body portions a distance equal to the thickness of the tile that is being made. The flanges 21 close the ends of these spaces between roller and platen or pallet and form the edges of the tile. By contrasting the section of Fig. 3 with the section of Fig. 5, it will be seen that the flanges 21 contact the concave face of the roller with equal efficiency at a narrow portion of the tile as at a wider portion of the tile and thus the tapering tile is made by endwise traversing movement of the platen or pallets with respect to the roller.

In the particular machine shown the filled platens or pallets are conducted beneath three rollers A, B and C, all of these rollers preferably being driven by the main drive motor 15 through the belts 22, 23 and 24. Note that the peripheries of roller A which contacts the tile moves in the direction of travel of the conveyor while rollers B and C move in the opposite direction. Before the platens or pallets reach roller A the cement mix which is contained in a hopper 25, is fed onto each of the platens or pallets. The feed mechanism is actuated by the variable speed motor 27 which rotates the shaft 28, said shaft having a spiral feed element 29 (Fig. 4) thereon.

H designates a hopper for receiving a finishing material such as white cement or other coloring or waterproofing material. A variable speed motor 30 drives a shaft 31 at the bottom of said hopper and this shaft carries a spiral rib 31a. This rib acts over a screen like or perforated sheet 32 and in this rotation the rib sifts the finishing material upon the relatively wet tile before the tile passes beneath the finishing or polishing roller C.

I may, if desired, provide alignment idlers 33 between which the carriers 16 travel and which idlers hold the carriers in accurate alignment with the rollers A, B, and C.

To prevent the lateral escape of the cement mix as it is being dumped onto the platen or pallet, I may provide guard plates 34 (see Fig. 2), upon the body of the machine.

As the platens or pallets are carried along beneath the rollers the first roller A distributes the charge or mass of mud evenly over the platen or pallet. This roller, as stated, rotates in the direction of travel of the platen or pallet. That is to say, that face of the roller which contacts the mud moves in the direction of travel of the platen or pallet and merely irons out, distributes and packs the mud into a tile shape of uniform thickness and density. As the platen or pallet in its continuing travel passes beneath the second roller a dense, compact and waterproof surface is imparted to the tile because this second roller B is rotating in a direction opposite to the direction of movement of the platen or pallet and tile shape. The provision of this compact waterproof surface is facilitated by the fact that in passing under and being squeezed and compressed by roller A the water content of the mud tends to come to the surface. Then when roller B, rotating in the opposite direction, engages the surface of the mud it smoothes and burnishes this surface of greater moisture content and makes a very smooth, slick, dense and waterproof article. In passing roller A the mud is initially piled up above the bottom of the roller so the roller can get hold of it and push it into the corners of the platen or pallet until the whole platen or pallet is evenly filled. But roller B cannot get hold of the mud because by the time the platen or pallet reaches roller B the top face of the tile shape lies so low, (due to its compression by roller A) that all that roller B can do its to burnish or rub out and impact the surface layer of the shape in the manner described.

As before stated the roller C is a finishing or polishing roller and it comes into action after the surface of the tile has had sifted upon it a powdery material of any desired nature. This may consist of white cement or any other coloring and/or waterproofing material. If a gray tile is desired this finishing material may be omitted by merely stopping the motor 30. However, the provision of this sifter at this point provides means for imparting any desired color to the tile. A pure white tile may be had and is very popular. While ordinarily I prefer to rotate the roller C in a direction opposite to the direction of travel of the tile, I wish to reserve the right to rotate this roller in the direction of travel of the tile. In this case there will be less rubbing and burnishing effect upon the tile and more of an impacting of the finishing material into the tile. This last method uses a very coarse finishing material with a coarse screen in the hopper H and thus impacts into the surface of the tile a coarse granular finish if that is desired. After the platens or pallets with the finished tile thereon have left roller C they come to a point in their travel where the finished tile is to be removed. That point is illustrated in Fig. 11 and here it will be seen that the upper flight of the chain of the conveyor engages the teeth (not shown) of a sprocket wheel 35. This sprocket wheel rotates a drum 36 and this drum carries curved spring blades 37 which act as ejectors to wipe against the undersides of the platens or pallets to lift them out of their carriers. In this case the platen or pallet of Fig. 8 has been shown. By referring to Fig. 8 it will be seen that the inner sides of the carrier 16a are provided with adjustable strips 16b. Adjustment of these strips makes it possible to adjust the thickness of the tile being formed.

I am aware of the fact that it has heretofore been proposed to manufacture cement roofing tile in a continuance operation. As far as I am aware I am the first to provide concave rollers acting in conjunction with platens or pallets, the body portions of which are transversely concentric with respect to the faces of the concave roller and wherein said platens or pallets are provided at their edges with flanges which engage the peripheries of the concave rollers at all points in the length of the platen or pallet even though the platen or pallet be a tapering one. As shown in Figs. 1 and 2 the pallet carriers are so disposed that the large ends of one tapering pallet is disposed toward the large end of the next adjacent pallet and the same is true of the small ends of the pallets. Thus when the compacting roller A is riding over the points between the confronting ends of the pallets there is no large gap left between said ends through which the compressed mud can escape. In the compacting action the mud is trapped between the face of the roller, the spaced curved body portion of the pallets and the flanges 21 at the edges of the pallet which flanges are contacting some portion of the face of the roller at all points along the length of the pallets as shown in contrast in Figs. 3 and 5. It is the flanges 21 which close the spaces at the sides of the pallet by extending from the edges of the pallets to the face of roller A while leaving the curved and tapered body portions of the pallets spaced from the roller a distance equal to the thickness of the tile to be formed.

Further, as far as I am aware I am the first to provide a tile making machine embodying a platen or pallet carrier, a plurality of rollers operating with respect thereto and means for bodily traversing the rollers and platens or pallets with respect to each other and wherein that roller first to engage the cement mix moves in the direction of bodily movement of the roller with respect to the mix and wherein the succeeding roller moves in the opposite direction.

Many ways will readily suggest themselves to those skilled in the art of modifying the mechanism to accomplish the same result by other means. Therefore it is to be understood that the invention is not limited to the precise construction set forth, but that it includes within its purview whatever changes fairly come within either the terms or the spirit of the appended claims.

Having described my invention what I claim is:

1. A platen or pallet carrier comprising an open frame having means for pivoting it for tilting at a point intermediate of its ends, the endwalls of said platen or pallet carrier being provided with inwardly extending surfaces shaped to receive and support the end portions of concavo-convex platens or pallets and being also provided with portions adapted to receive and to support out-turned flanges upon said platens or pallets.

2. Means for manufacturing longitudinally tapering and transversely concavo-convex roofing tiles comprising a concave roller, a plurality of longitudinally tapering pallets, said pallets being concavo-convex in cross section, means for supporting the pallets in end to end relation and conveying them beneath said roller with their convex sides toward said roller, said pallets having flanges along their opposite edges which project toward and contact with the face of the concave roller at all points in the length of the platens in their travel beneath the roller, the depth of the flanges being such as to maintain the convex faces of the platens spaced from the face of the roller a distance equal to the thickness of the tile to be formed.

3. A structure as recited in claim 2 wherein the platens are disposed with their large ends toward each other and with their small ends toward each other.

GUS W. LANG.

REFERENCES CITED

The following references are of record in the file of this patent:

UNITED STATES PATENTS

| Number | Name | Date |
|---|---|---|
| 629,102 | Borrowe et al. | July 18, 1899 |
| 796,124 | Hutchinson | Aug. 1, 1905 |
| 1,342,192 | Trevillian | June 1, 1920 |
| 1,377,188 | Domine | May 10, 1921 |
| 1,425,015 | Hyten et al. | Aug. 8, 1922 |
| 1,435,906 | Williams | Nov. 14, 1922 |
| 1,663,106 | Warfield | Mar. 20, 1928 |
| 2,282,891 | Schwalbe | May 12, 1942 |